(12) United States Patent
Flauzac

(10) Patent No.: US 6,814,101 B2
(45) Date of Patent: Nov. 9, 2004

(54) EXCESSIVE FLOW VALVE

(75) Inventor: Jean-Claude Flauzac, Woincourt (FR)

(73) Assignees: UMAC Inc., Exton, PA (US); Chuchu Decayeux, S.A.S., Woincourt (FR)

( * ) Notice: Subject to any disclaimer, the term of this patent is extended or adjusted under 35 U.S.C. 154(b) by 0 days.

(21) Appl. No.: 10/630,980

(22) Filed: Jul. 31, 2003

(65) Prior Publication Data

US 2004/0074542 A1 Apr. 22, 2004

Related U.S. Application Data

(60) Provisional application No. 60/399,388, filed on Jul. 31, 2002.

(51) Int. Cl.⁷ .............................................. F16K 17/168
(52) U.S. Cl. .............. 137/614.17; 137/517; 137/543.17
(58) Field of Search ........................... 137/614.17, 517, 137/513.5, 498, 460, 543.17

(56) References Cited

U.S. PATENT DOCUMENTS

| | | | | |
|---|---|---|---|---|
| 2,771,091 A | * | 11/1956 | Baker et al. ................. | 137/542 |
| 3,146,792 A | * | 9/1964 | Donnelly et al. ...... | 137/614.17 |
| 4,958,657 A | * | 9/1990 | Hagan et al. ................ | 137/517 |
| 5,373,868 A | * | 12/1994 | Rodriguez ............. | 137/614.17 |
| 5,613,518 A | * | 3/1997 | Rakieski ...................... | 137/517 |
| 5,755,259 A | * | 5/1998 | Schulze et al. ............. | 137/460 |
| 6,003,550 A | * | 12/1999 | Saarem et al. ......... | 137/614.17 |

* cited by examiner

Primary Examiner—Kevin Lee
(74) Attorney, Agent, or Firm—Browdy and Neimark, P.L.L.C.

(57) ABSTRACT

A valve which has a valve body having a through-bore to permit the flow of gas through the through-bore, an excessive flow valve disposed within the through-bore of the valve body, the excessive flow valve including a supporting tube having a plurality of struts, an axial bore extending through the supporting tube, a stem movable axially against a spring within the bore and a disk on a free end of the stem. The excessive flow valve is engaged in a through-bore of the valve body.

14 Claims, 2 Drawing Sheets

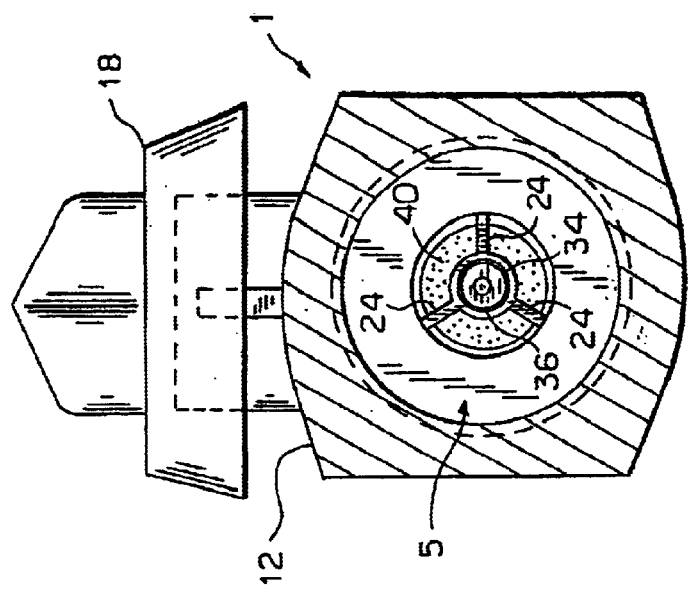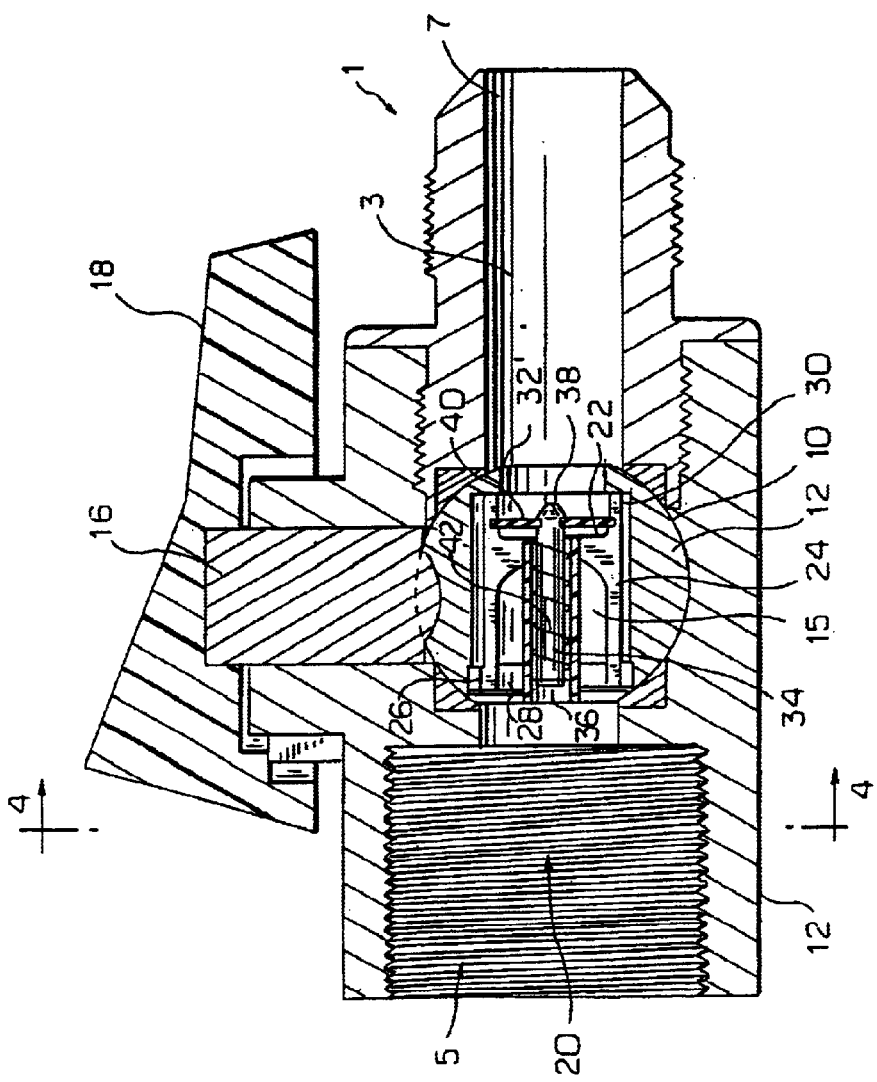

EXCESSIVE FLOW VALVE

BACKGROUND OF THE INVENTION

1. Field of the Invention

This invention relates to a valve which automatically shuts off the flow of combustible gas from a ruptured conduit or failed fitting.

2. Description of Prior Art

Conventional combustible distribution systems bring gas from a street main below ground level, through a tapping tee, a service line, a riser above ground level, a meter cock, a regulator, a meter and then into the customer's structure.

Rupture of the line or failure of fittings between the consumer property line and the served customer structure can occur for any number of reasons. Among these are digging by the customer or other party, ground settling, failure of a regulator, failure of a meter, failure of fittings and earthquakes. Rupture of the line or failure of fittings can also occur on the inside customer fuel gas piping or flexible connection. Dangerous explosive conditions can arise when any such rupture occurs.

Prior art patents show various structures for shutting off the gas flow when the flow exceeds a predetermined value, e.g. due to the downstream rupture. These include automatic excessive flow valves (EFV) separated from a manual shut off valve near the gas main and downstream of the tapping tee or a combination of an EFV and manual shut-off valve in a single unit. Separate valves require installing the excessive flow valve and the shut-off valve at two locations which has certain apparent disadvantages, including more work for the installer or plumber and consequently greater cost, and the need to provide twice as many connection points with, consequently, twice as many locations for potential leakage, i.e. four connection points instead of two connection points. By combining the EFV and manual shut-off valve in a single unit these disadvantages are overcome. Further, the resultant device can be used where the gas service line inside the home or other structure connects to an appliance such as a gas dryer, oven, furnace, water heater or fireplace.

U.S. Pat. No. 6,003,550 ('550) combines two such separate valves by incorporating an EFV in a rotative shut-off valve member. However, the EFV of '550 and those conventional EFV's separate from the manual shut off valve are all more complicated than that of the valve according to the invention.

OBJECT AND SUMMARY OF THE INVENTION

An object of the invention is directed to a unique and improved EFV which can be used either as an EFV separated from a manual shut off valve by inserting the EFV into a valve housing, section of pipe, other system flow area component or into a ball of a manual shut-off valve. Such insertion requires minimal modification of the to accept the EFV according to the invention for permanent installation.

The modular design of the EFV affords easy and inexpensive installation requiring no additional hardware for operation.

The EFV according to the invention comprises a tripod which aids stability, and its retention features in the valve housing, pipe or ball of the manual shut-off valve double as the EFV seat for the shut-off disk of the EFV.

Unlike constructions employing snap rings, threads, and the like on which debris accumulates, minimal surfaces are presented by the EFV according to the invention for such accumulation.

The EFV according to the invention can also be easily reset by simply closing the corresponding shut-off valve.

The spring design and low weight of the EFV according to the invention maximize a small change in trip flow due to orientation.

The EFV is also superior to gravity operated valves because of orientation independence; and it is superior to magnet designs because a magnetic float is subject to clogging as debris tends to gather at the magnet of such float.

The above objectives are achieved by an improved excess flow valve according to the invention inserted into a valve housing, section of pipe or other system flow area component separate from the corresponding manual shut-off valve or inserted into a rotatable stopcock of a shut-off valve.

The separated EFV valve according to the invention comprises an outer body or housing (preferably formed of brass) formed in a separate valve housing (which may be a section of pipe) having a bore extending therethrough which serves as a gas passageway and retains the improved EFV according to the invention. The combined EFV and manual shut-off valve has a cavity along the gas passageway in which a rotatable ball resides having a bore extending therethrough which can be aligned with the gas passageway. The ball carries a stem which extends through the brass housing on which a rotatable handle is engaged, so that the ball can be rotated within the cavity to an "on" position, in which the bore through the ball aligns with the passageway, or to an "off" position 90° from the "on" position, wherein the ball blocks the gas passageway.

Fitted within either the bore of the valve housing or the bore of the ball of the combined valves is the improved excess flow valve (EFV) according to the invention. This EFV is formed primarily of a rigid polymer material, comprising a tubular supporting body having three supporting struts extending out from the tubular supporting body and spaced at 120° from one another forming a tripod configuration. The tubular supporting body of the EFV has an axial bore extending therethrough and a spring biased stem movable axially within the bore having a nose which extends outwardly from the downstream end of the supporting body which carries a soft disk which is seatable on a shoulder within the bore of a separate EFV valve or the ball of the combined valves to close the excess flow valve upon a drop in pressure downstream from the valve.

Should service be required on an appliance served by the improved EFV according to the invention, or if for some reason it were necessary to manually shut off the gas to the appliance, the corresponding shut-off valve can be manually turned to the off position to accomplish this result. In operation, the stem of EFV is spring biased opposite to the direction of flow. Under normal conditions the disk on the stem is held away from a valve seat by the bias spring. When the flow is excessive, such as when the service line ruptures downstream of the EFV, the forces from the flowing fluid overcome the spring bias and the disk closes against the seat, shutting off the flow. Thus, the dangerous flow of combustible gas is stopped.

BRIEF DESCRIPTION OF THE DRAWING

FIG. 3 shows a section through the longitudinal axis of the EFV according to FIG. 1 engaged in a manual stop valve, and FIG. 4 shows a section transverse to the longitudinal axis of the valve of FIG. 3 along section line 4—4.

DETAILED DESCRIPTION OF THE PREFERRED EMBODIMENTS

Figure 2:
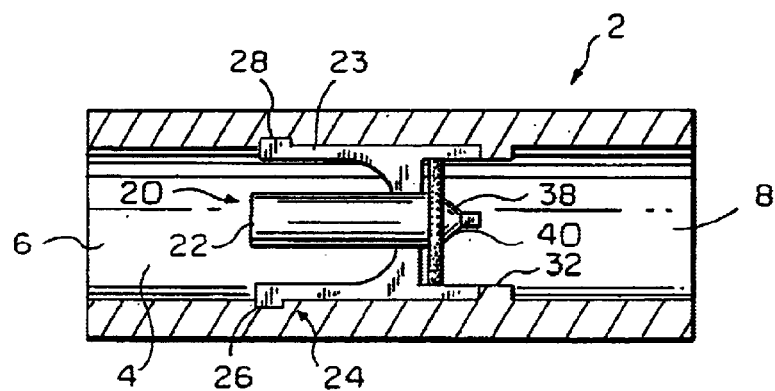
FIG. 2 shows a section through the longitudinal axis of the EFV according to FIG. 1 engaged in a separate valve housing.

As shown in FIG. 2, the valve housing 2 which could be simply a section of pipe has a bore 4 serving as a gas passageway with an inlet 6 an outlet 8. It is understood that such a valve housing is conventional and could have various combinations of conventional means to join their ends to adjoining pipes such as threads corresponding to threads on the adjoining pipes, soldering etc. These means for joining the valve housing to adjoining pipes are not part of this invention and accordingly are not shown. The valve housing 2 is unique only in providing annular groove 28 and annular shoulder 32 for engagement with the EFV 20, according to the invention which is further described below.

As shown in FIG. 3, the manual shut-off valve 1 shown in FIG. 3 has a valve housing 12 provided with a gas passageway 3 having an inlet 5 and outlet 7 and cavity 10 formed along passageway 3. A rotatable ball valve 12 with a bore 15 therethrough is engaged within cavity 10 of the valve housing 12. When the valve is open, the longitudinal axis of passageway 3 and that of the bore 15 are concentric. The ball valve 12 has a stem 16 which extends through housing 12 to engage handle 18 so that the ball valve 12 can be rotated within cavity 10 to an "on" position in which bore 15 aligns coaxially with passage 3, or to an "off" position 90° from the "on position" where ball valve 12 blocks gas passageway 3. Various means for joining the ends of valve housing 12 to adjoining pipes are also conventional. All of the above features are conventional but similar to FIG. 2, the rotatable ball 12 is unique only in providing annular groove 28' and annular shoulder 32' for engagement with EFV 20.

Figure 1:
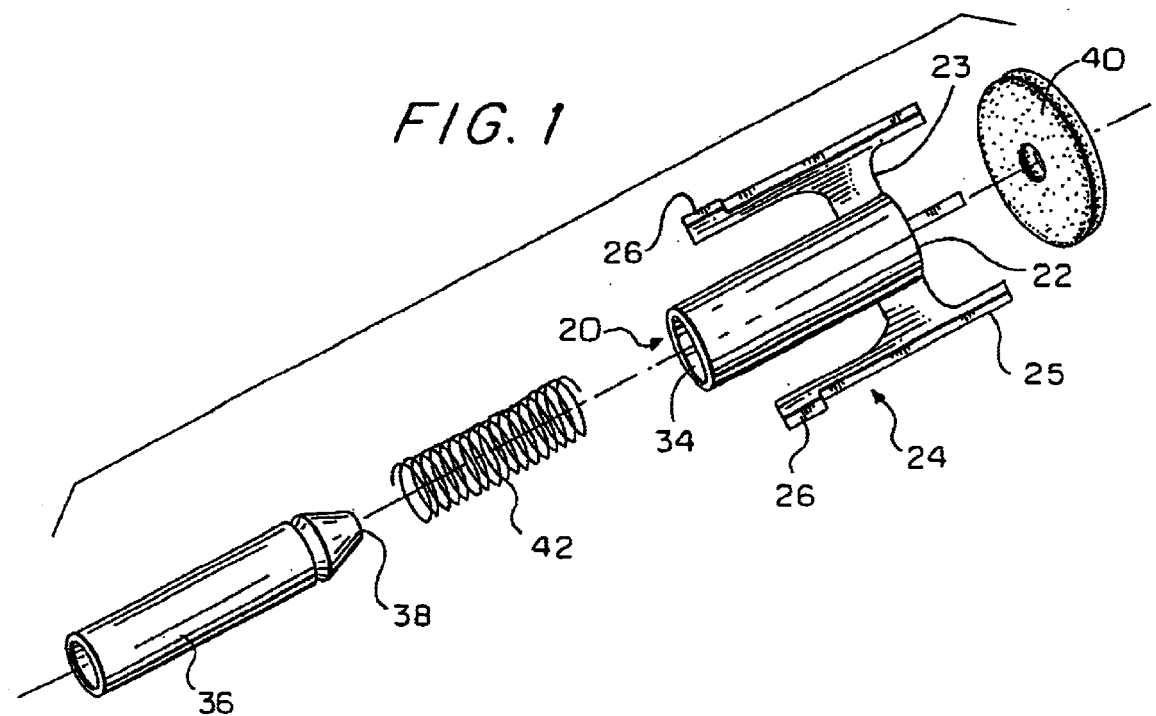
FIG. 1 shows a perspective exploded view of the improved excess flow valve (EFV) according to the invention for use within the bore of a separate valve housing or the bore of a combined EFV and manual stop valve.

FIG. 1 shows an exploded perspective view of the excess flow valve (EFV) according to the invention. EFV 20 has a supporting tube 22 from which three supporting struts 24 project outward. Each strut 24 comprises a first section 23 which projects radially away from tube 22 and a second section 25 having a longitudinal length parallel to the axis of tube 22. The supporting tube 22 is made integrally with struts 24, preferably from a rigid polymer material.

As can be seen in FIG. 4, the three supporting struts 24 project radially from tube 22 and are spaced at a 120° angle from one another to form a tripod design. The rigid polymer material is sufficiently resilient to permit the three supporting struts 24 to be snapped into the bore 4 of the valve housing 12 shown in FIG. 2 or the bore 15 of the ball 12 of the manual shut-off valve 1 shown in FIG. 3 by engaging the projection 26 of each of the struts 24 into annular groove 28 of the valve housing 2 of FIG. 2 or the annular groove 28' of the ball 12 of the shut-off valve 1 of FIG. 3. In this position the free end 30 of each of the three supporting struts 24 are engaged against the annular shoulder 32 on the valve housing 2 or the annular shoulder 32' of ball of shut-off valve 1.

The supporting tube 22 of the EFV has an axial bore 34 extending therethrough with a stem 36 movable axially against a spring 42 engaged within bore 34. The stem 36 has a nose 38 which extends outwardly from the downstream end of supporting tube 22. A soft disk 40 having a diameter larger than the inner diameter of either annular shoulder 32 or 32' is seatable on either shoulder 32, 32' to close the valve when there is a break in the gas line resulting in increased pressure against disk 40.

Should service be required on an appliance on the gas line, or if for some reason it were to become necessary to manually shut off the gas to the appliance, the shut-off valve corresponding to EFV 20 is manually turned to the off position to achieve this result. In operation, the stem 36 is spring biased by a spring 42 opposite to the directions of flow. Under normal conditions the disk on the stem 36 is held away from the shoulder 32 by the bias spring 42. When the flow is excessive such as when the service line ruptures the force from the flowing fluid overcome the spring bias and the disk 40 closes against the seat on shoulder 32, 32', shutting off the flow. When the corresponding shut-off valve is turned off, disk 40 returns to its initial position, urged by spring 42.

The foregoing description of the specific embodiments will so fully reveal the general nature of the invention that others can, by applying current knowledge, readily modify and/or adapt for various application such specific embodiments without undue experimentation and without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification and/or in the claims below, followed by a functional statement, are intended to define and over whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. A valve comprising,
    a valve body (2) having a through-bore (4) to permit the flow of gas through the through-bore (4);
    an excessive flow valve (20) comprising a supporting tube (22) spaced apart from the valve body (2) having a plurality of struts (24), an axial bore (34) extending into the supporting tube (22), a stem (36) movable axially against a spring (42) within the axial bore (34) and a disk (40) on a free end of the stem (36);
    wherein the excessive flow valve (20) is engaged in the through-bore (4) of the valve body by said plurality of struts (24) so as to permit the gas to flow around supporting tube (22).

2. The valve of claim 1, wherein the supporting tube and the struts are made of a rigid polymer material sufficiently resilient to be snap engaged into the bore of the valve body.

3. The valve of claim 2, wherein the first end of each of the plurality of struts has a projection extending away from the axis of the supporting tube, each said projection being snap engaged in an annular groove in the through-bore of the valve body while a second end of each of the plurality of struts is engaged against an annular shoulder extending toward the axis of the valve body.

4. The valve of claim 3, wherein the disk is seated on said annular shoulder against the spring when the excess flow valve is closed and drawn away from the annular shoulder by the spring when open.

5. The valve of claim 3, wherein the supporting tube has three struts each having a first portion extending radially out from the supporting tube and spaced 120° from one another and a second portion engaged to the first portion which together have a tripod configuration.

6. The valve of claim 1, wherein the valve body is movable within a housing between an open position and a closed position by a handle outside the housing which is engaged to the valve body by a shaft through the housing.

7. The valve of claim 6, wherein the valve body is spherical and is engaged in a spherical cavity within the housing.

8. The valve of claim 1, wherein the disk is engaged in a groove at the free end of the stem.

9. The valve of claim 1, wherein the disk moves on the stem along the axis of the valve body within the plurality of struts.

10. The valve of claim 1 installed in a gas fuel service line immediately upstream from a gas appliance, and constituting the only valve in said gas fuel line immediately upstream from the appliance.

11. The valve of claim 1, wherein the valve body is pipe.

12. The valve of claim 1, wherein the valve body is valve housing having means for respectively connecting ends thereof to pipes.

13. The valve of claim 5, wherein the second portion of the strut has a longitudinal length parallel to the axis of the supporting tube.

14. The valve of claim 13, wherein the projection and the second end engaged against the annular shoulder are both located on the second portion of the struts.

* * * * *